(12) United States Patent
Inoue et al.

(10) Patent No.: US 6,347,570 B1
(45) Date of Patent: Feb. 19, 2002

(54) AUTOMATIC BRAKE BOOSTER

(75) Inventors: Hidefumi Inoue; Naohito Saito, both of Saitama-Ken (JP)

(73) Assignee: Bosch Braking Systems Co., Ltd., Tokyo (JP)

(*) Notice: Subject to any disclaimer, the term of this patent is extended or adjusted under 35 U.S.C. 154(b) by 0 days.

(21) Appl. No.: 09/638,128

(22) Filed: Aug. 14, 2000

(30) Foreign Application Priority Data

Sep. 3, 1999 (JP) .......................................... 11-250286

(51) Int. Cl.$^7$ ................................................ B60T 13/57
(52) U.S. Cl. ...................................................... 91/367
(58) Field of Search ............................. 91/367, 376 R

(56) References Cited

U.S. PATENT DOCUMENTS 5,611,257 A * 3/1997 Eick ............................. 91/367
5,845,556 A * 12/1998 Tsubouchi et al. ............. 91/367

FOREIGN PATENT DOCUMENTS

JP 4-262958 9/1992

* cited by examiner

Primary Examiner—Edward K. Look
Assistant Examiner—Thomas E. Lazo
(74) Attorney, Agent, or Firm—Flynn, Thiel, Boutell & Tanis, P.C.

(57) ABSTRACT

A valve mechanism of an automatic brake booster comprises a vacuum valve seat formed on a valve body to face forward, an atmosphere valve seat formed on the rear portion of a valve plunger, and a valve element adapted to be seated on the both valve seats from the front side thereof. The valve plunger is associated with a solenoid plunger which allows the valve plunger to extend therethrough to permit a relative displacement therebetween and which is integrally connected thereto at an advanced end position thereof. A resilient member is provided which normally maintains the solenoid plunger at the advanced end position relative to the valve plunger. This simplifies a valve mechanism in comparison to a conventional automatic brake booster, thus improving the reliability.

4 Claims, 7 Drawing Sheets

AUTOMATIC BRAKE BOOSTER

FIELD OF THE INVENTION

The present invention relates to an automatic brake booster which is used in a brake of an automobile or the like, and more particularly, to an improvement of a valve mechanism thereof.

DESCRIPTION OF THE PRIOR ART

An automatic brake booster comprising a valve body slidably disposed within a shell, a power piston mounted on the valve body, a constant and a variable pressure chamber defined across the power piston, a valve mechanism mounted on the valve body for controlling a switching of a flow path, an input shaft coupled to a brake pedal for movement therewith for causing a valve plunger, which forms part of the valve mechanism, to advance to switch the flow path, and drive means which also forms part of the valve mechanism and which causes a ring, that is engaged with the valve plunger as the latter is advanced, to advance to switch the flow path is known in the art (Japanese Laid-Open Patent Application No. 262,958/1992).

In an automatic brake booster of the kind described, the drive means generally comprises a solenoid.

With the automatic brake booster arranged in the manner mentioned above, the drive means may be operated to achieve a brake operation without the depression of the brake pedal. In a conventional booster, the valve mechanism and the drive means which switches a flow path thereof have been disposed as spaced from each other in order to avoid an increase in the size of the booster.

SUMMARY OF THE INVENTION

In view of the foregoing, it is an object of the invention to provide an automatic brake booster of a high reliability with an arrangement which is simple as compared with the valve mechanism of a conventional automatic brake booster.

Specifically, the present invention relates to an automatic brake booster comprising a valve body slidably disposed within a shell, a power piston mounted on the valve body, a constant and a variable pressure chamber defined across the power piston, a valve mechanism mounted on the valve body for controlling a switching of a flow path, an input shaft coupled to a brake pedal for movement therewith for causing a valve plunger, which forms part of the valve mechanism, to advance to switch the flow path, and drive means which also forms part of the valve mechanism and which causes a ring, that is engaged with the valve plunger as the latter is advanced, to advance to switch the flow path and further comprises a solenoid plunger disposed on the valve plunger to be displaceable with respect thereto and adapted to be integrally connected to the valve plunger at an advanced end position thereof, and a resilient member interposed between the solenoid plunger and the valve plunger for maintaining the solenoid plunger at the advanced end position.

With the described arrangement, since the solenoid plunger which is caused to advance by the drive means and the valve plunger, which forms part of the valve mechanism, are coupled by the resilient member to move together, operating the drive means allows the flow path in the valve mechanism to be switched to achieve an automatic brake operation without the depression of the brake pedal.

Consequently, a simplification of the arrangement of the valve mechanism in comparison to the prior art allows the reliability of the automatic brake booster to be improved.

Above and other objects, features and advantages of the invention will become apparent from the following description of several embodiments thereof with reference with the attached drawings.

DETAILED DESCRIPTION OF THE EMBODIMENTS

Figure 1:
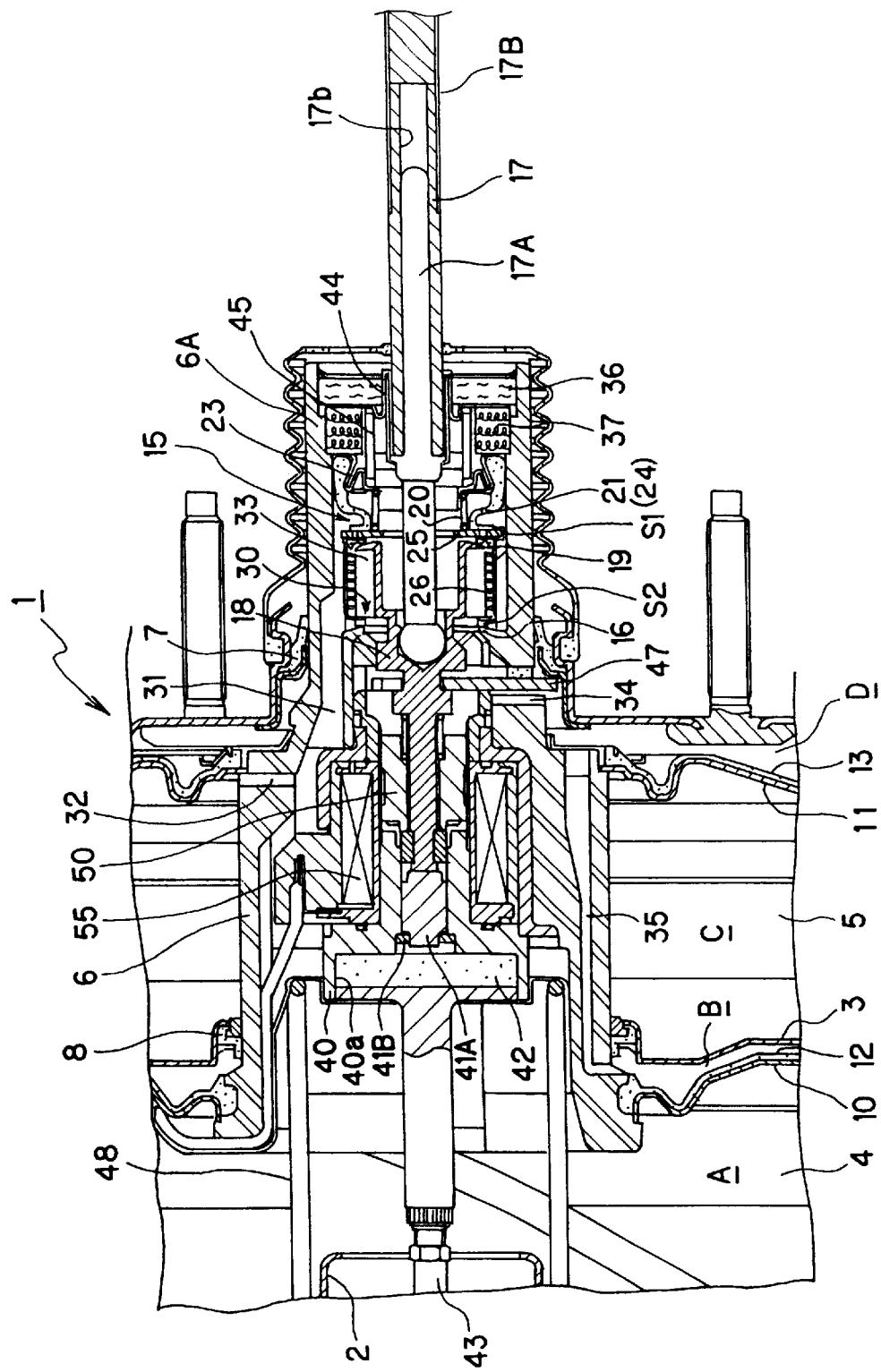
FIG. 1 is a cross section of one embodiment of the invention.

Referring to the drawings, several embodiments of the invention will now be described. In FIG. 1, a tandem brake booster 1 includes a shell 2, the interior of which is partitioned by a center plate 3 into a front chamber 4 and a rear chamber 5, which are located thereacross. A tubular valve body 6 slidably extends through the rear end of the shell 2 and the center plate 3, with seal means 7 and 8 interposed therebetween maintaining a hermetic seal thereat.

A front power piston 10 and a rear power piston 11 are connected to the outer periphery of the valve body 6 at locations which are situated within the front chamber 4 and the rear chamber 5, respectively. A front diaphragm 12 and a rear diaphragm 13 are applied to the back surfaces of the respective pistons 10 and 11. In this manner, a constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

A valve mechanism 15 which switches a communition between the constant pressure chambers A and C and the variable pressure chambers B and D is mounted on the valve body 6.

Specifically, the valve mechanism 15 comprises a vacuum valve seat 16 formed on the distal end of an annular projection of a greater diameter which extends rearward from the inner periphery of the valve body 6, a valve plunger 18 slidably fitted into the valve body 6 and coupled to an input shaft 17 for movement therewith, an atmosphere valve seat 19 formed on the rear end of the valve plunger 18, and a valve element 21 urged by a poppet return spring 20 in a forward direction and having a first seat area S1 adapted to be seated on the atmosphere valve seat 19 and a second seat area S2 adapted to be seated on the vacuum valve seat 16.

The valve mechanism 15 also comprises an axial constant pressure passage 31 formed within the valve body 6 and communicating a space located radially outward of a vacuum valve 30 which is formed by the vacuum valve seat 16 and the second area S2 with the constant pressure chamber A, a radial constant pressure passage 32 which communicates the constant pressure passage 31 with the constant pressure chamber C, a radial variable pressure passage 34 which communicates a space between the vacuum valve 30 and an atmosphere valve 33 which is formed by the atmosphere valve seat 19 and the first seat area S1 with the variable pressure chamber B, an axial variable pressure passage 35 which communicates between the variable pressure chambers B and D, and an atmosphere passage 36 formed in a terminal tubular portion 6A for communicating a space located radially inward of the atmosphere valve 33 with the atmosphere, with a filter 37 disposed within the atmosphere passage 36. The constant pressure chamber A communicates, through a negative pressure introducing tube, not shown, which is mounted on the shell 2 with an intake manifold of an engine, whereby a negative pressure is normally introduced into the constant pressure chambers A and C.

Figure 2:
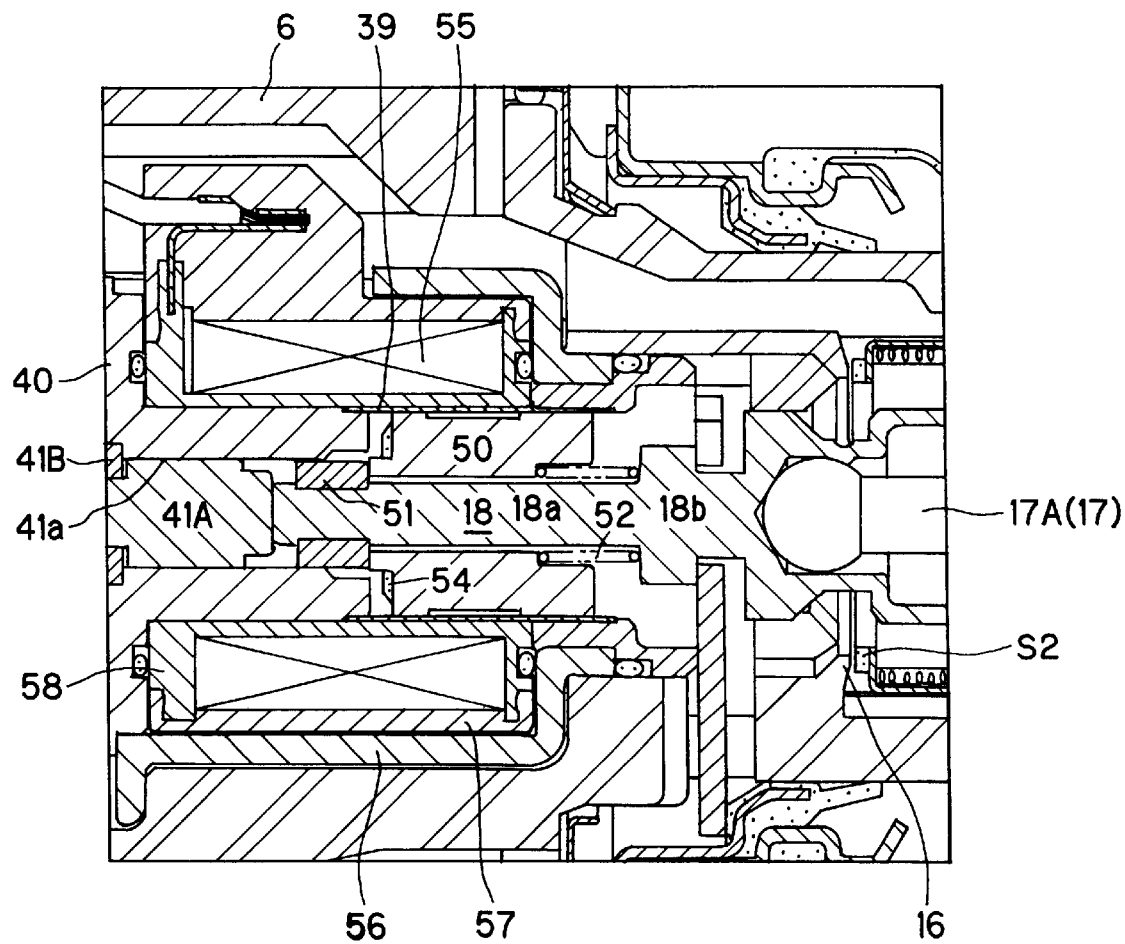
FIG. 2 is an enlarged cross section of an essential part shown in FIG. 1.

As shown in FIG. 2, the valve element 21 comprises a rolling portion 24 having a rear end which is secured to the terminal tubular portion 6A of the valve body 6 by a substantially tubular retainer 23, a backup plate 25 connected to the front end of the rolling portion 24, and a tubular portion 26 connected to the backup plate 25 and extending forwardly. The second seat area S2 comprises an elastomer which is seated on the vacuum valve seat 16 on the distal end of the tubular portion 26 while the first seat area S1 comprises an elastomer which is seated on the atmosphere valve seat 19 formed on the front end face of the backup plate 25.

As shown in FIG. 1, the right end of the valve plunger 18 is connected to the left end of the input shaft 17, the right end of which is connected to a brake pedal, not shown. A plunger 41A which is fitted into a stepped opening 40a of a guide 40 which comprises a magnetic pole, a plate plunger 41B and a reaction disc 42 are sequentially disposed to the left of the valve plunger 18. One end of an output shaft 43 is disposed in abutment against the left end face of the reaction disc 42, and this end of the output shaft 43 is contained within the stepped opening 40a formed in the guide 40 while the other end of the output shaft projects to the outside of an axial portion of the shell 2.

As shown in FIG. 2, the plate plunger 41B allows a small diameter portion 41a of the plunger 41A to extend slidably therethrough, and thus the small diameter portion 41a represents substantially the surface of the plunger 41A against which the reaction disc 42 abuts. During a normal depression, the plate plunger 41B engages the plunger 41A to transmit a brake reaction which is transmitted thereto through the plunger 41A to the valve plunger 18 while during the automatic brake operation, the plate plunger 41B engages the guide 40 to transmit the brake reaction which is transmitted thereto to the valve body 6.

As shown in FIG. 1, a valve return spring 45 is disposed between the retainer 23 which is secured within the terminal tubular portion 6A of the valve body 6 and another retainer 44 which is fitted around the input shaft 17, and the resilience of the return spring 45 urges the input shaft 17, the valve plunger 18, and the valve element 21 which is seated on the atmosphere valve seat 19 of the valve plunger 18 rearward.

Also as shown in FIG. 1, the valve plunger 18 is prevented from being withdrawn from the valve body 6 by means of a key member 47 which is well known in the art. When the booster is inoperative, the key member 47 is held in abutment against the seal member 7 which has a plate embedded therein to maintain the valve plunger 18 at its advanced position relative to the valve body 6.

A return spring 48 is disposed between the front inner wall of the shell 2 and the valve body 6 for normally maintaining the valve body 6 at its inoperative position shown.

An automatic brake booster has previously been proposed which allows a brake operation to be automatically achieved without the depression of the brake pedal, by switching a flow path in the valve mechanism (see Japanese Laid-Open Patent Application No. 262,958/1992, for example). However, it is required that the valve mechanism and the drive means which switches the flow path must be disposed as spaced from each other to avoid an increase in the size of the booster, resulting in a complicated coupling arrangement between the valve mechanism and the drive means and hence the arrangement of the valve mechanism.

However, in the present embodiment, the valve mechanism is simplified as compared with the conventional automatic brake booster, thus providing an automatic brake booster of a high reliability.

Specifically, a tubular solenoid plunger 50 which is formed of a magnetizable material is loosely fitted over the small diameter portion 18a of the valve plunger 18 from the front end thereof, and then an engaging member 51 is fitted on the front end of the small diameter portion 18a to prevent the solenoid plunger 50 from being withdrawn. In this manner, the solenoid plunger 50 is axially displaceable between the body 18b of the valve plunger 18 and the engaging member 51.

A resilient member in the form of a coiled spring 52 is disposed between the left end face of the solenoid plunger 50 and the end face of the body 18b for normally maintaining the solenoid plunger 50 at its advanced end position where it abuts against the engaging member 51.

In the inoperative condition shown in FIG. 1, there is a given clearance between the solenoid plunger 50 and the rear end of the guide 40 and this clearance is chosen to be less than the forward travel of the valve plunger 18 which is preset for the quick braking operation or the amount by which the atmosphere valve 33 is opened during the quick braking operation. It will be noted that rubber 54 is applied to the left end face of the solenoid plunger 50 to serve as a buffer member which prevents the sound of percussion from occurring as it abuts against the rear end face of the guide 40.

As shown in FIG. 2, the guide 40 is inserted into a yoke 56 which contains the solenoid 55 without leaving any clearance diametrically, thus substantially forming an integral part of the valve body 6. A resin mold 57 which is L-shaped in section is fitted into the yolk 56, and a bobbin 58 is integrally fitted with the mold 57 to define an annular space in which the solenoid 55 is contained.

The valve plunger 18 is slidably supported by the inner peripheral surface of the bobbin 58 through the engaging member 51 while the body 18b is slidably supported by the inner peripheral surface of the valve body 6. There are slight clearances diametrically between the outer periphery of the small diameter portion 18a of the valve plunger 18 and the inner periphery of the solenoid plunger 50 and between the outer periphery of the solenoid plunger 50 and the inner periphery of the bobbin 58. This allows a smooth relative displacement between the valve plunger 18 and the solenoid plunger 50 without causing any stick therebetween.

A pipe 39 is fitted over the yoke 56 and the bobbin 58, and the solenoid plunger 50 is located inside the pipe 39. The purpose of the pipe 39 is to allow for a smooth movement of the solenoid plunger 50.

In the present embodiment, the input shaft 17 comprises a first input shaft section 17A which is connected to the valve plunger 18, and a second input shaft section 17B having a bottomed portion 17b (see FIG. 1) in which a terminal end of the first input shaft section 17A is received and having its other end connected to the brake pedal. The retainer 44 is engaged with the first input section 17A to urge it rearward, thus normally maintaining the first input shaft section 17A and the second input shaft section 17B in engagement with each other.

Consequently, during a normal brake depression, the first input shaft section 17A and the second input shaft section 17B engage each other and move forward in an integral manner, but during an automatic brake operation, only the first input shaft section 17A moves forward against the valve return spring 45. Accordingly, what is required of the solenoid 55 is to haul the solenoid plunger 50, the valve plunger 18 and the first input shaft section 17A against the friction thereof and against the resilience of the valve return spring 45. Accordingly, an output which is required from the solenoid 55 can be reduced in comparison to that required when the input shaft is constructed as an integral assembly.

With the present embodiment constructed in the manner mentioned above, when a brake pedal is rapidly depressed under the inoperative condition shown in FIG. 1, the first input shaft section 17A and its engaged second input shaft section 17B, the valve plunger 18, its abutting plunger 41A and its engaged plate plunger 41B are driven forward relative to the valve body 6 while the coiled spring 52 mounted on the valve plunger 18 causes the solenoid plunger 50 to be driven forward relative to the valve body 6 until the solenoid plunger 50 abuts against the guide 40 to stop its advancing motion.

However, if the solenoid plunger 50 comes to a stop, the coiled spring 52 which has been maintaining the solenoid plunger 50 at its advanced end position where it engages the engaging member 51 is compressed, and accordingly, the first input shaft section 17A and the second input shaft section 17B, the valve plunger 18, the plunger 41A and the plate plunger 41B continue moving forward until the key member 47 abuts against an end face of the groove in the valve body 6 where their movement is stopped.

Under this condition, a given clearance is maintained between the atmosphere vale seat 19 and the first seat area S1 of the valve element 21, or the atmosphere valve 33 is opened to its maximum extent. Accordingly, the atmosphere is rapidly introduced into the variable pressure chambers D and B, whereby the valve body 6 and the output shaft 43 are rapidly driven forward to achieve a quick braking operation. The valve body 6 comes to a stop at a position where a servo balance condition is reached, meaning that the brake reaction which is transmitted from the output shaft 43 through the reaction disc 42 is balanced with a force which depresses the brake pedal.

If the brake pedal is operated gently, the valve body 6 is driven forward in a tracking manner and comes to a stop at a position where the advancing force and the brake reaction are balanced, and accordingly the coiled spring 52 is not always compressed during the normal brake operation.

On the other hand, when a controller, not shown, excites the solenoid 55 with an ordinary current flow, a force of attraction is produced between the solenoid 55 and the solenoid plunger 50 which is formed of a magnetizable material to drive the solenoid plunger 50 forward, whereby its engaging valve plunger 18 and the first input shaft section 17A are also driven forward relative to the valve body 6, and the plunger 41A which abuts against the valve plunger 18 and the plate plunger 41B which is engaged with the plunger 41A are also driven forward against the resilience of the return spring 45.

As a consequence, the valve element 21 which is seated on the atmosphere valve seat 19 formed on the valve plunger 18 is removed therefrom and becomes seated upon the vacuum valve seat 16 formed on the valve body 6, whereupon the atmosphere is introduced through the atmosphere valve 33 which is now open through the variable pressure passage 34 into the variable pressure chamber D, and through the variable pressure passage 35 into the variable pressure chamber B, thus driving the valve body 6 and the output shaft 43 forward to achieve a braking operation. The valve body 6 comes to a stop at a servo balance condition where the brake reaction which is transmitted from the output shaft 43 through the reaction disc 42 is balanced with the thrust from the solenoid plunger 50 and is maintained at this condition.

However, when the controller mentioned above excites the solenoid 55 with a current flow which is higher than usual, a greater force of attraction acts between the solenoid 55 and the solenoid plunger 50 formed by the magnetizable material, whereby the solenoid plunger 50 is rapidly driven forward. Consequently, its engaging valve plunger 18 and the first input shaft section 17A are rapidly driven forward relative to the valve body 6, and the plunger 41A which abuts against the valve plunger 18 and the plate plunger 41B which is engaged with the plunger 41A are also rapidly driven forward against the resilience of the return spring 45.

In response thereto, the valve element 21 which has been seated on the atmosphere valve 19 formed on the valve plunger 18 is removed therefrom and becomes seated upon the vacuum valve seat 16 formed on the valve body 6, and the atmosphere valve 33 is opened to a greater extent than usual to introduce the atmosphere into the variable pressure chamber D through the variable pressure passage 34, and into the variable pressure chamber B through the variable pressure passage 35, whereupon the valve body 6 and the output shaft 43 are driven forward to achieve a stronger braking operation than a usual automatic brake operation. When the solenoid plunger 50 abuts against the guide 40 to cease moving forward, the valve plunger 18 and the first input shaft section 17A also stop their forward motion.

At this time, the solenoid plunger 50 is maintained in engagement with the engaging member 51 under the action of the coiled spring 52 or is maintained at the advanced end position of the valve plunger 18, and accordingly, the clearance between the atmosphere valve seat 19 and the valve element 21 is less during the automatic brake operation than during the normal brake operation. The valve body 6 comes to a stop at a servo balance position where the brake reaction which is transmitted from the output shaft 43 through the reaction disc 42 is balanced with the thrust from the solenoid plunger 50.

Accordingly, with the present embodiment which allows an automatic brake operation to be achieved by using the engaging member 51 and the coiled spring 52 to couple the solenoid plunger 50 and the valve plunger 18 on which the atmosphere valve seat 19 is formed to cause them to move together, the arrangement can be simplified in comparison to the conventional valve mechanism.

If the opening of the atmosphere valve 33 is chosen to be less during the automatic brake operation as compared with that of the normal brake operation, the valve opening during the normal brake operation can be set up large enough to allow a power saving in the solenoid 55 without detracting from the operational response during the normal brake operation as compared with an arrangement in which an equal opening is chosen for the atmosphere valve during the normal brake operation and the automatic brake operation.

Specifically, if a relative displacement of the solenoid plunger is chosen high, it becomes necessary that the solenoid output which is required to haul the solenoid plunger be increased by a corresponding amount. Such a solenoid will be expensive and has an increased weight. In consideration of these drawbacks, it is preferred that the relative displacement of the solenoid plunger be reduced. When the relative displacement of the solenoid plunger is chosen to be low, the relative displacement of the valve plunger 18 during the normal brake operation (or the opening of the atmosphere valve 33) will also be reduced to degrade the operational response during the normal brake operation, thus rendering it difficult to allow the output from the solenoid to be reduced by choosing a small relative displacement. However, the present embodiment provides a solution to the conflicting requirements.

Figure 3:
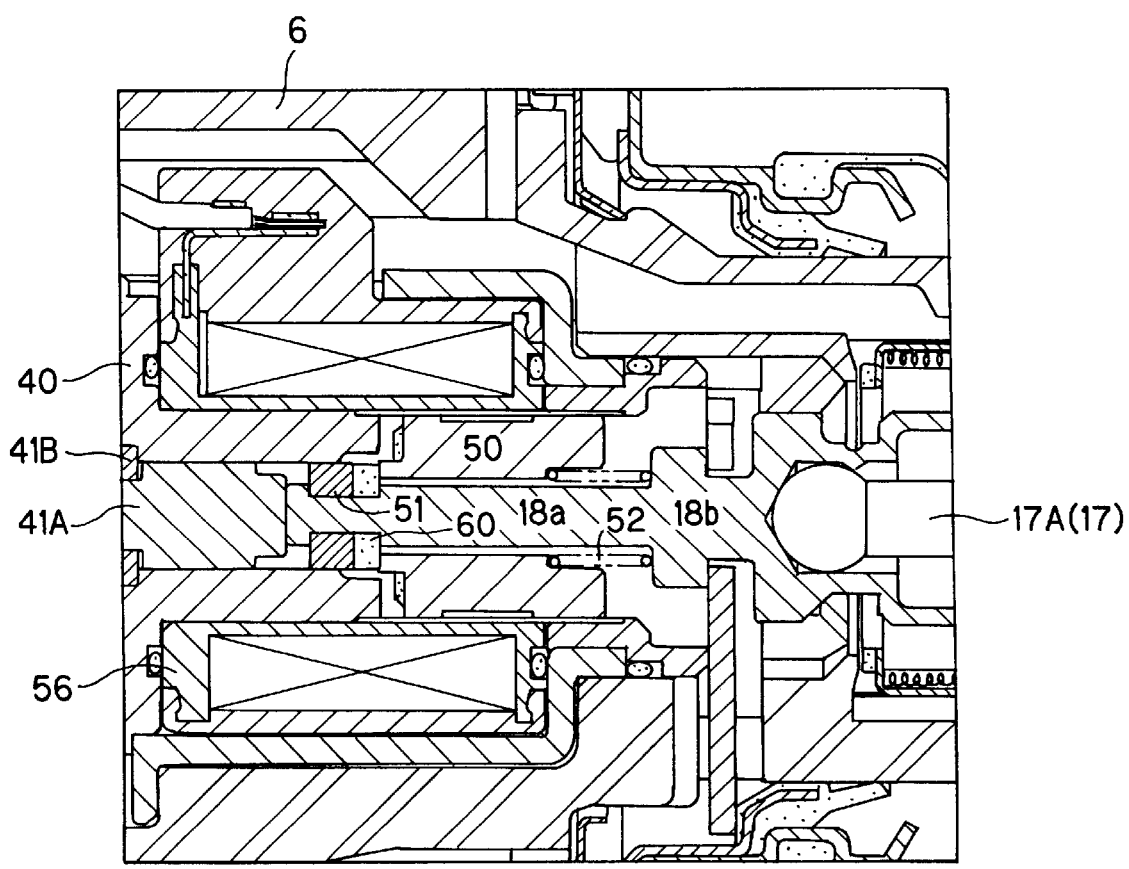
FIG. 3 is an enlarged cross section showing rubber 60 (buffer member) interposed between a solenoid plunger 50 and an engaging member 51.

As shown in FIG. 3, a buffer member 60 which is formed of an elastic material may be interposed between the solenoid plunger 50 and the engaging member 51 for preventing sound of percussion from occurring between the solenoid plunger 50 and the engaging member 51 as a result of the automatic brake operation or impacts during the running and for preventing sound of percussion when the normal brake operation is terminated to allow the solenoid plunger 50 and the engaging member 51 which have been held spaced from each other to abut against each other.

Figure 4:
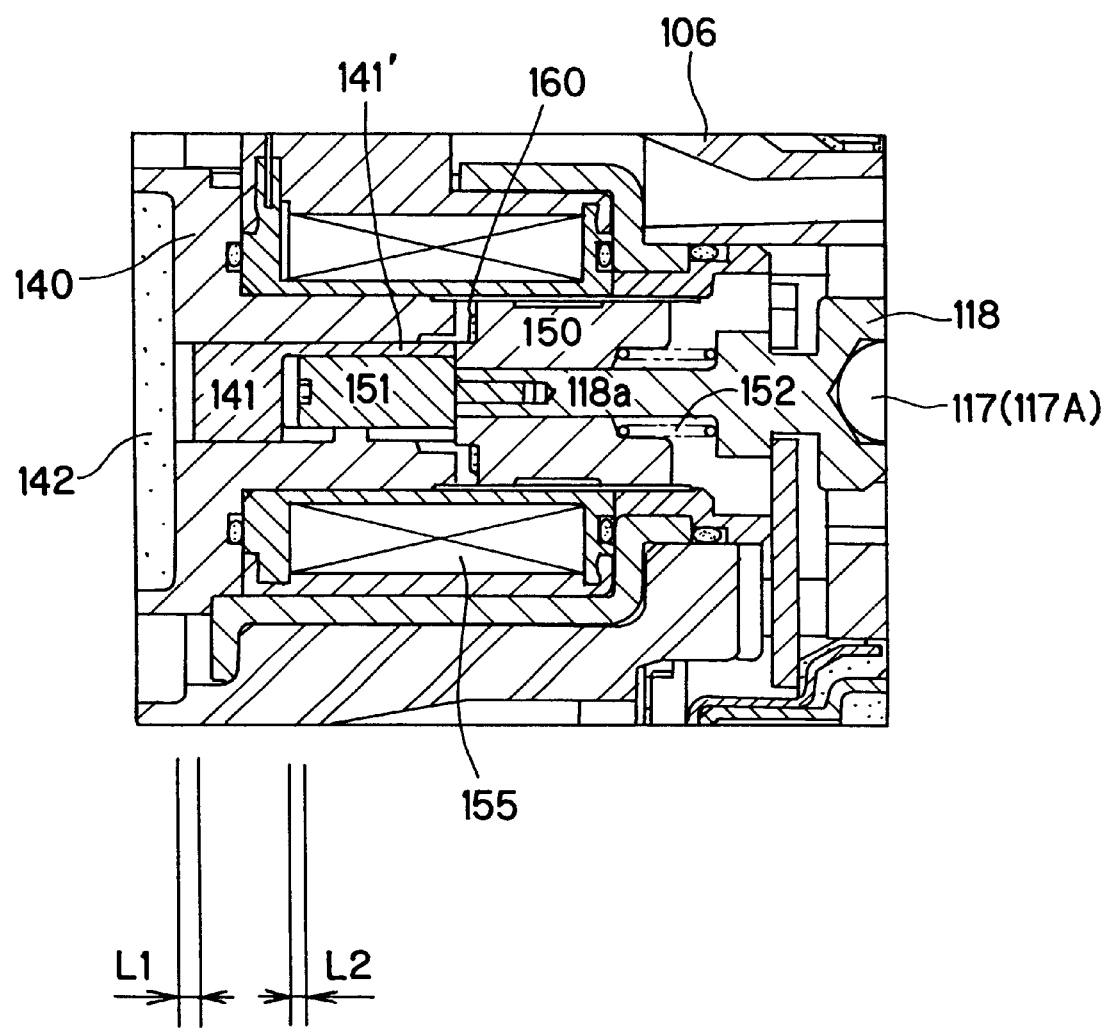
FIG. 4 is an enlarged cross section showing an essential part of a second embodiment of the invention.
Figure 5:
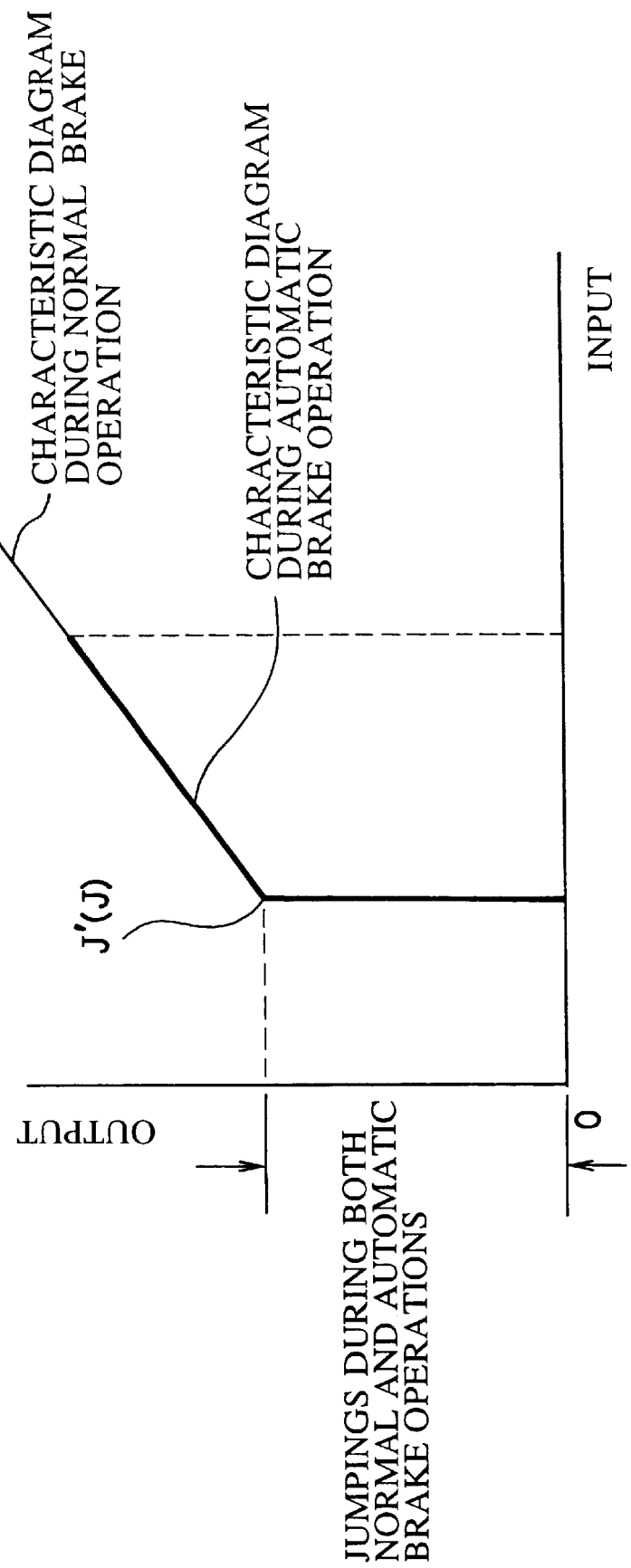
FIG. 5 is a characteristic diagram of the first embodiment during a normal brake operation and an automatic brake operation.

FIG. 4 shows a second embodiment of the invention. In the first embodiment, the brake reaction which is transmitted from the reaction disc 42 is entirely transmitted through the valve plunger 18 to the solenoid plunger 50. As a consequence, a characteristic diagram during a normal brake operation (shown by a thin line) and a characteristic diagram during an automatic brake operation (shown by a thick line) coincide with each other, as indicated in FIG. 5, and accordingly a jumping J during the normal brake operation is equal to a jumping J' during the automatic brake operation. By contrast, in the present embodiment, there is provided reaction transmitting means which allows the jumping J' during the automatic brake operation to be reduced in comparison to the jumping J during the normal brake operation, thus allowing a delicate speed adjustment during the automatic brake operation as compared with the first embodiment.

Specifically, a plunger 141 has a rear end face, which is formed around the outer periphery thereof with a rearwardly extending tubular portion 141', which serves as a reaction transmitting means, with the rear end face of the tubular portion 141' being disposed in abutment against a front end face of a solenoid plunger 150.

When the booster is inoperative, a given clearance L1 is provided between the front end face of the plunger 141 and the rear end face of a reaction disc 142.

An engaging member 151 is connected to the free end of a small diameter portion 118a of a valve plunger 118 and is sidably fitted inside the tubular portion 141a of the plunger 141, with its rear end face being disposed in abutment against the front end face of the solenoid plunger 150.

When the booster is inoperative, a given clearance L2 is formed between the front end face of the engaging member 151 and the rear end face of the plunger 141. It is to be noted that the plate plunger 41B which is used in the first embodiment is eliminated in this embodiment.

In other respects, the arrangement is similar to that of the first embodiment mentioned above, and accordingly, corresponding parts to those shown in the first embodiment are designated by like reference characters as used in the first embodiment, to which 100 is added.

In the second embodiment, when a brake pedal is depressed under the inoperative condition shown in FIG. 4, an input shaft 117, the valve plunger 118 and the engaging member 151 are driven forward relative to a valve body 106 while a coiled spring 152 disposed between the solenoid plunger 150 and the valve plunger 118 causes the solenoid plunger 150 and its abutting plunger 141 to be driven forward relative to the valve body 106.

Under this condition, a valve mechanism, not shown, is switched to open an atmosphere valve, whereby the atmosphere is introduced into the variable pressure chambers D and B, thus driving the valve body 106 and an output shaft forward to achieve a braking operation.

At this time, the forward travel of the valve body 106 is still small, and thus the reaction disc 142 maintains its original form, whereby there is a slight clearance between the rear end face of the reaction disc 142 and the front end face of the plunger 141 while the clearance L2 is maintained between the rear end face of the plunger 141 and the front end face of the engaging member 151. This means that even though a brake output is actually delivered, there is no brake reaction acting upon the valve plunger 118, and this corresponds to a jumping position shown by a thick line in FIG. 6.

When the brake pedal is further depressed, the valve body 106 is driven further forward, whereby the reaction disc 142 is increasingly compressed to abut against the plunger 141, whereupon a brake reaction begins to be transmitted from the reaction disc 142 which is bulgingly deformed through the plunger 141 and the coiled spring 152 to the valve plunger 118.

Figure 6:
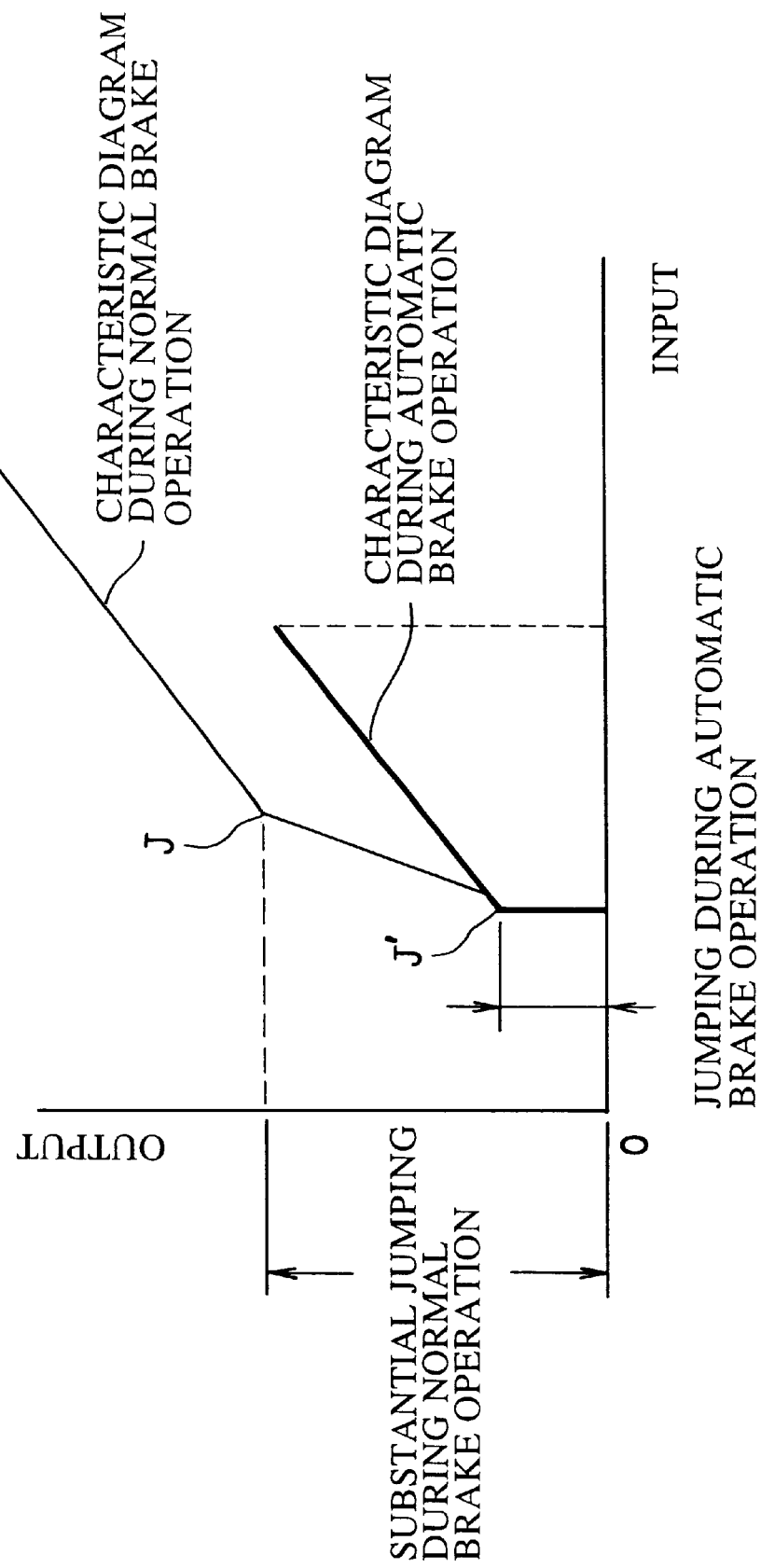
FIG. 6 is a characteristic diagram of the second embodiment during a normal brake operation and an automatic brake operation.

At this time, the output rises momentarily in accordance with a servo ratio indicated by a thick line as shown in FIG. 6 until the brake reaction exceeds a load to which the coiled spring 152 is charged, but as the brake reaction exceeds the charged load of the coiled spring 152 to compress it, the output rises rapidly with a servo ratio which is greater than the servo ratio prevailing during the automatic brake operation or that indicated by the thick line, and this means that the jumping is substantially continued.

Subsequently, as the brake pedal is further depressed to increase the compression of the coiled spring 152, the clearance between the plunger 141 and the engaging member 151 is reduced, and eventually the engaging member 151 abuts against the plunger 141 (point J).

When the engaging member 151 abuts against the plunger 141 in this manner, the output rises gently with a servo ratio which is the same as the servo ratio during the automatic brake operation, indicated by the thick line, as indicated by a thin line in FIG. 6.

Accordingly, with the present embodiment, even though the jumping on the characteristic diagram during the normal brake operation is represented by point J', a driver senses the substantial jumping point J.

When the brake pedal is rapidly depressed, the solenoid plunger 150 may temporarily abut against the guide 140, which forms part of the valve body 106. Even in such instance, the coiled spring 152 is compressed to allow a forward movement of the input shaft 117 and the valve plunger 118 in the manner mentioned above, thus opening the atmosphere valve to a greater extent to achieve a quick braking operation.

By contrast, when a controller, not shown, excites the solenoid 155, the solenoid plunger 150 and its abutting plunger 141 as well as the engaging member 151 and its connected valve plunger 118 move forward relative to the valve body 106.

At this time, the forward travel of the valve body 106 is still small, and thus the reaction disc 142 maintains its original form, whereby there is a very slight clearance between the rear end face of the reaction disc 142 and the front end face of the plunger 141 while maintaining the clearance L2 between the rear end face of the plunger 141 and the front end face of the engaging member 151.

Under this condition, there is no brake reaction acting upon the valve plunger 118 even though a brake output is actually delivered, thus corresponding to a jumping condition indicated by the thick line in FIG. 6.

As the solenoid 155 continues to be excited, there occurs a compression of the reaction disc 142 between the valve body 106 and an output shaft, not shown, whereby a central portion of the reaction disc 142 is deformed in a bulging manner into the guide 140 to abut against the plunger 141, whereupon a brake reaction begins to be transmitted from the reaction disc 142 which is deformed by bulging through the plunger 141 to the solenoid plunger 150 (point J').

Accordingly, during the automatic brake operation, as soon as the clearance L1 between the plunger 141 and the reaction disc 142 is consumed, the brake reaction is immediately transmitted, thus allowing the jumping J' to be reduced in comparison to the jumping J during the normal brake operation, as indicated by the thick line in FIG. 6. In this manner, a delicate brake control is permitted in a region of smaller braking output.

Accordingly, with the second embodiment, a similar functioning and effect as achieved by the first embodiment can be obtained, and in addition, the jumping J' during the automatic brake operation can be reduced as compared with the jumping J during the normal brake operation. Accordingly, this allows a brake control in a lower output range than with the first embodiment without detracting from the operating feeling experienced during the normal brake operation, thus alleviating a sense of extraordinariness when the automatic brake operation is used.

A servo ratio in a region between point J' and point J can be suitably changed by changing a spring constant k of the coiled spring 152.

Figure 7:
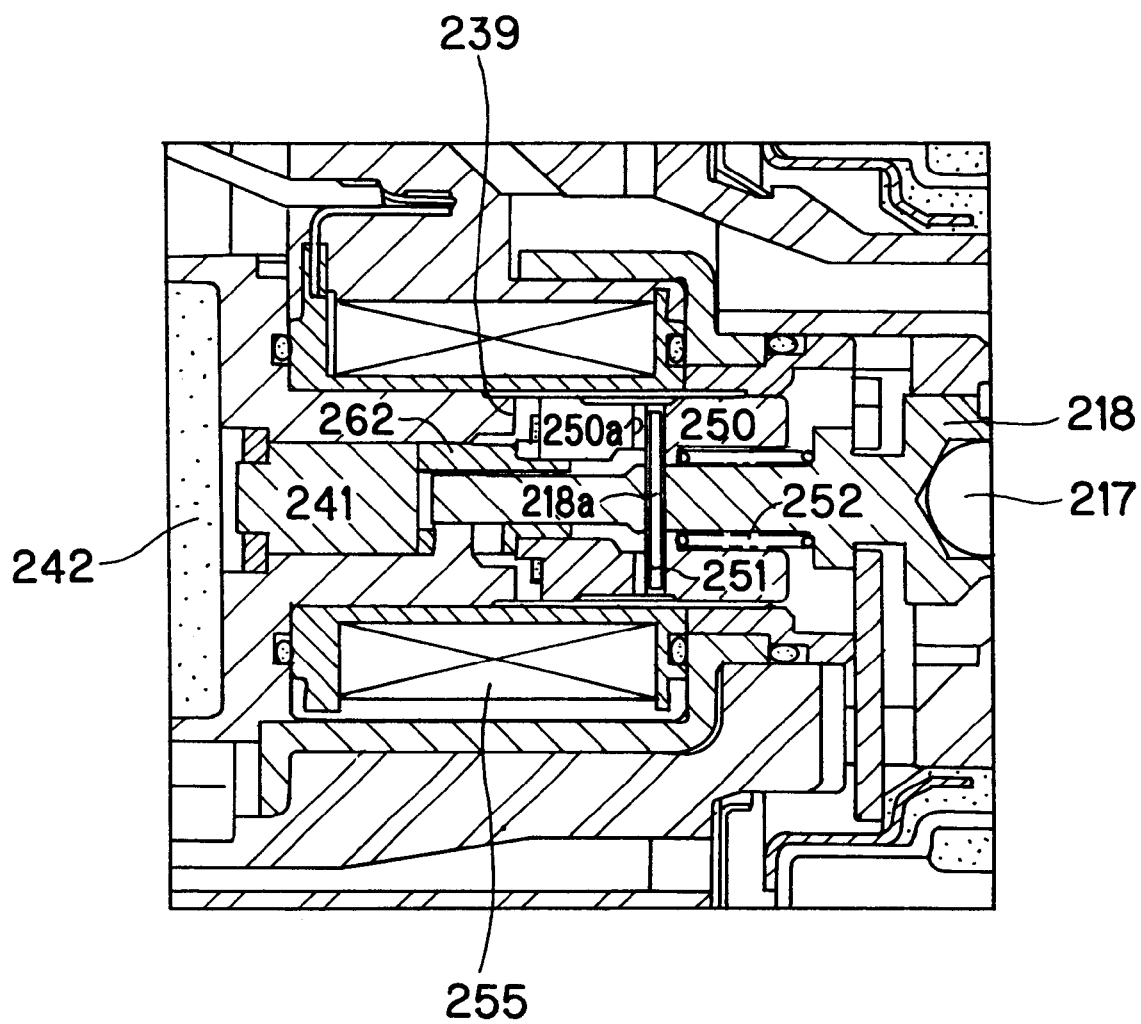
FIG. 7 is an enlarged cross section of an essential part of a third embodiment of the invention.

FIG. 7 shows a third embodiment of the invention. In the first embodiment, the engaging member 51 is provided on the front end of the valve plunger 18 in an integral manner, and the rear end face of the engaging member 51 is disposed in abutment against the front end face of the solenoid plunger 50. However, in the present embodiment, an engagement between a valve plunger 218 and a solenoid plunger 250 is achieved by a forked engaging pin 251.

The engaging pin 251 is loosely fitted to extend through an engaging opening 250a formed in the solenoid plunger 150 at an intermediate position thereof and is fitted into and secured to a notch 218a formed in the outer periphery of the valve plunger 218.

During the normal brake operation, if the solenoid plunger 250 abuts against the guide 239, a forward movement of the valve plunger 218 is permitted.

In the second embodiment, the tubular portion 141' which transmits a brake reaction to the solenoid plunger 150 is formed to be integral with the plunger 141, but such reaction transmitting means is a separate tubular member 262 in the present embodiment.

In other respects, the arrangement is similar to that of the first embodiment, and accordingly, corresponding parts to those shown in the first embodiment are designated by like reference characters as used in the first embodiment, to which 200 is added.

The third embodiment constructed in the manner mentioned above achieves the similar functioning and effect as achieved by the first and the second embodiment.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. An automatic brake booster comprising a valve body slidably disposed within a shell, a power piston mounted on the valve body, a constant and a variable pressure chamber defined across the power piston, a valve mechanism mounted on the valve body for controlling a switching of a flow path, an input shaft coupled to a brake pedal for movement therewith for causing a valve plunger, which forms part of the valve mechanism, to advance to switch the flow path, and drive means which also forms part of the valve mechanism and which causes a ring, that is engaged with the valve plunger as the latter is advanced, to advance to switch the flow path; further comprising a solenoid plunger disposed to be displaceable with respect to the valve plunger and adapted to be integrally connected to the valve plunger at an advanced end position thereof, and a resilient member disposed between the solenoid plunger and the valve plunger for maintaining the solenoid plunger at the advanced end position.

2. An automatic brake booster according to claim 1, further comprising reaction transmitting means for transmitting a brake reaction to the solenoid plunger.

3. An automatic brake booster according to claim 1 in which the input shaft comprises a first input shaft section connected to the valve plunger, and a second input shaft section coupled to a brake pedal for movement therewith and engaged with the first input shaft section in a manner to permit a relative displacement therebetween, the arrangement being such that when a brake pedal is depressed, the second input shaft section is engaged with the first input shaft section to drive the valve plunger and the solenoid plunger forward while when the drive means is operated to drive the solenoid plunger and the valve plunger forward, the first input shaft section is driven forward relative to the second input shaft section.

4. An automatic brake booster according to one of claim 1 in which the drive means comprises a solenoid.

* * * * *